UNITED STATES PATENT OFFICE.

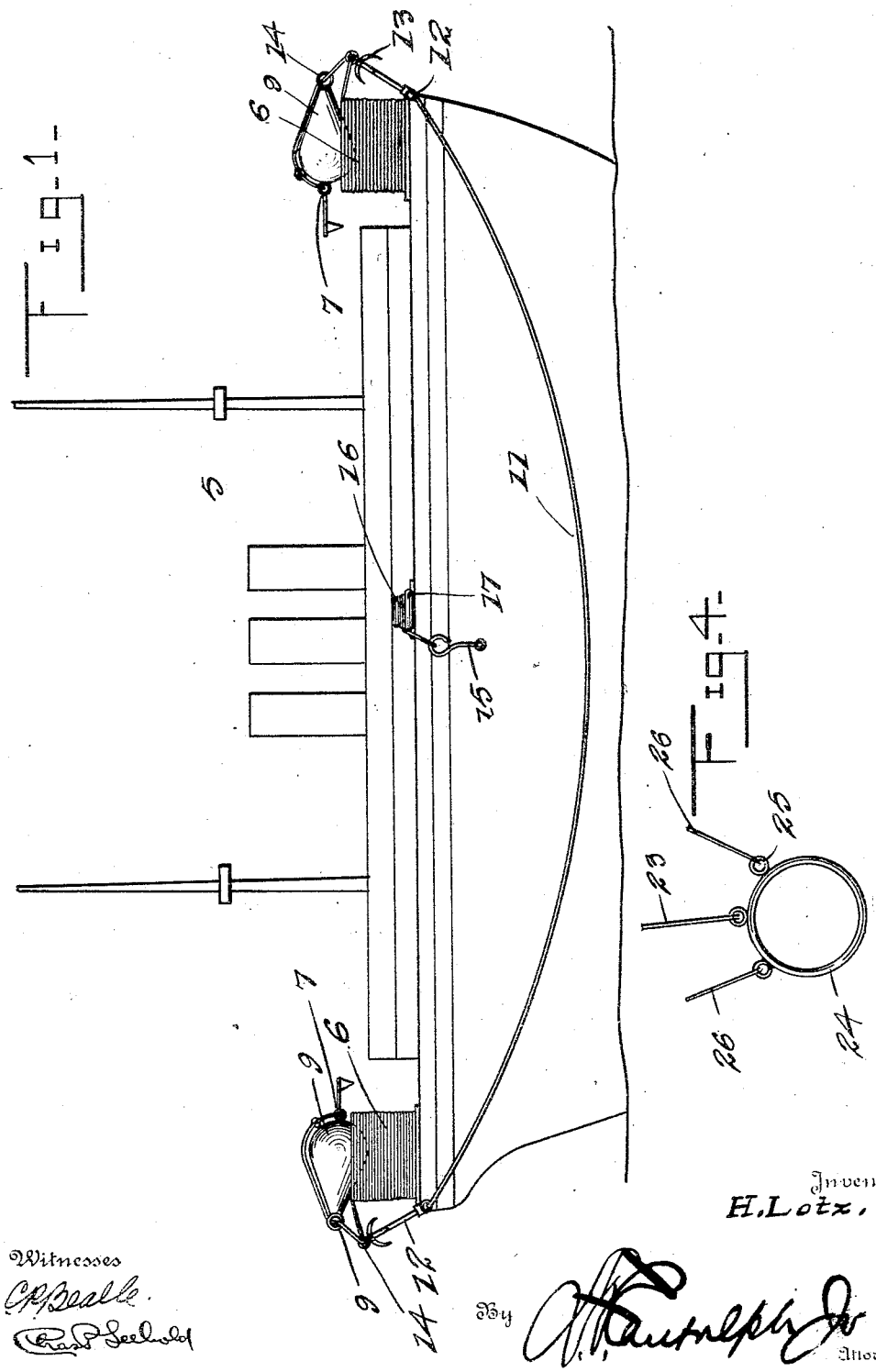

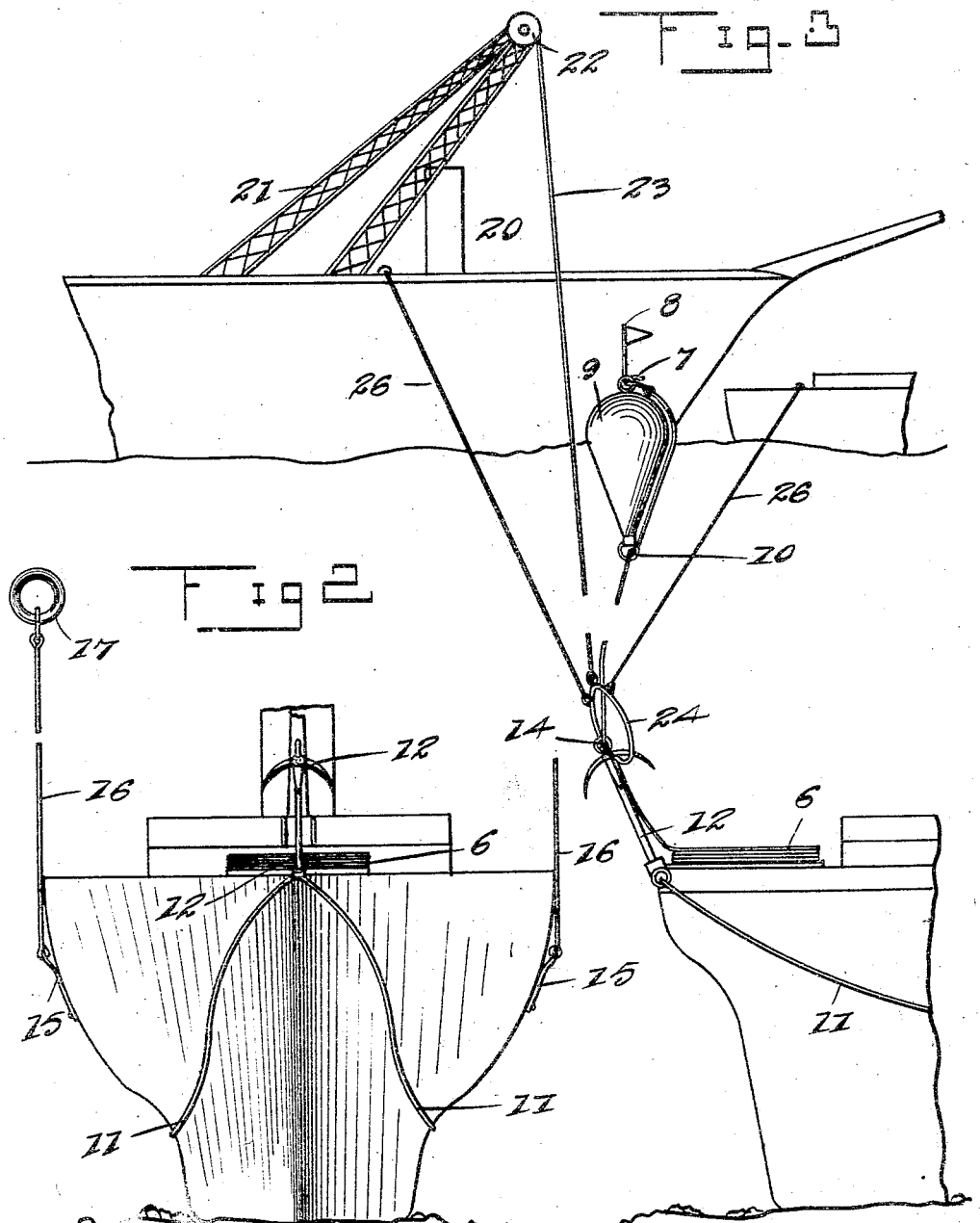

HENRY LOTZ, OF LAWRENCE, MASSACHUSETTS.

DEVICE FOR RAISING SUNKEN VESSELS.

1,133,160.  Specification of Letters Patent.  Patented Mar. 23, 1915.

Application filed July 10, 1914. Serial No. 850,194.

*To all whom it may concern:*

Be it known that I, HENRY LOTZ, a subject of the Czar of Russia, residing at Lawrence, in the county of Essex and State of Massachusetts, have invented certain new and useful Improvements in Devices for Raising Sunken Vessels; and I do hereby declare the following to be a full, clear, and exact description of the invention, such as will enable others skilled in the art to which it appertains to make and use the same.

This invention relates to devices for raising sunken vessels and has for its object to provide an apparatus of strong and reliable construction for raising the large modern type of vessels.

Another object is the provision of an apparatus of this character embodying a buoy for locating the sunken vessel secured to the vessel by a suitable rope, or the like, constituting a guide rope or line for guiding the raising lines to operative position on grapples carried by the sunken structure.

Another object is the provision of means for maintaining the vessel on an even kneel as it is raised to the surface of the water.

With these and other objects in view, the invention consists in the novel construction, arrangement and formation of parts as will be hereinafter specifically described, claimed and illustrated in the accompanying drawings, in which:

Figure 1 represents a side elevation of a vessel equipped with a part of the raising apparatus. Fig. 2 represents a front elevation of the ship, showing several of the lines in raised position. Fig. 3 represents a view in side elevation illustrating the manner of raising the sunken vessel by the improved apparatus. Fig. 4 represents an enlarged detail view of a part of the apparatus.

Referring to the drawings in detail, wherein similar reference numerals designate corresponding parts throughout the several views, the numeral 5 indicates generally a vessel at the bow and stern of which a line or cable 6 is coiled upon the deck. One end of the line 6 is secured to the vessel 5 and the opposite end is provided with a hook 7 removably engaged over the staff 8 projecting upwardly from the upper end of the buoy 9 carrying an eye 10 at its lower extremity through which the line 6 passes.

Cables 11 are arranged longitudinally of the opposite side and under the body of the ship, the front and rear terminals of the cables 11 being secured to the shanks 12 having inwardly curved arms 13 at their opposite extremities constituting grapples. Eyes 14 are also secured in the upper extremities of the shanks 12 and receive the lines 6 at the bow and stern of the vessel, whereby when the buoys 9 float to the surface of the water the shanks 12 are reliably retained in substantially vertical position.

Hooks, or the like 15, are secured adjacent the center of the sides of the vessel, and the ends of cables or the like 16 are attached thereto. The cables 16 are normally coiled upon the decks of the vessel adjacent the hooks 15 and carry at their ends opposite the latter circular buoys 17 adapted to appear on the surface of the water as the vessel 5 nears the surface while being raised.

The raising ship 20 is provided with the usual crane 21 carrying the pulley 22 at its upper extremity over which is extended the raising line 23 attached at one end to a power operated winding drum, or the like, (not shown). The opposite extremity of the raising line 23 is provided with an annular member 24 carrying a plurality of eyes 25. Auxiliary or guide lines 26 are attached to the eyes 25 on opposite sides of the raising line 23.

To raise a vessel equipped with the herein-described raising devices, the rings 24 carried by the raising line of two raising ships 20 are positioned over the line 6, the hooked extremities 7 of which are raised to the surface of the water by the float or buoy 9 after the vessel 5 sinks. The annular members 24 are preferably formed of heavy metal and slip downwardly on the lines 6 and over one or more of the arms 13 of the grapples at the bow and stern of the sunken ship. In this way the lower extremities of the raising lines or cables 23 are attached to the sunken vessel, which latter is raised as the cables 23 are drawn up by suitable devices, not shown, carried by the raising ship 20. As the sunken vessel nears the surface of the water the auxiliary buoys 17 carried by the short cables or lines 16 float to the surface of the water, and as the lines 16 are of exactly the same length it is clearly evident that by retaining the buoys 17 the same distance out of water the sunken vessel is retained on an even keel as it is raised to the surface.

What I claim is:

In combination, a vessel, a line secured at one end to said vessel, a buoy removably secured to said line, cables secured longitudinally and under said vessel, grapples including shanks secured at their free ends to said cables and curved arms at the upper ends of said shanks, eyes carried by said grapples above said arms slidably receiving the first mentioned line, an annular member, a plurality of eyes carried by said annular member, a raising line attached to one of said eyes, and guide lines secured in the other eyes.

In testimony whereof I affix my signature in presence of two witnesses.

HENRY LOTZ.

Witnesses:
MICHAEL A. SULLIVAN,
KARL L. SCHOBER.